Patented Feb. 4, 1936

2,029,572

UNITED STATES PATENT OFFICE 2,029,572

MANUFACTURE OF YEAST

George W. Kirby, New York, and Charles N. Frey, Scarsdale, N. Y., assignors to Standard Brands Incorporated, New York, N. Y., a corporation of Delaware No Drawing. Application January 26, 1932, Serial No. 589,048

5 Claims. (Cl. 195—20)

This invention relates to processes of manufacturing bakers' yeast which may be distributed in either compressed or dried form, and has as a general object the provision of a process which may be carried out in a simple, efficient and economical manner to the production of high yields of yeast of improved keeping quality.

A further object of the invention is to provide a process of manufacturing bakers' yeast of good baking quality and of improved color and keeping qualities.

A more particular object of the invention is to provide a process of manufacturing bakers' yeast in high yields and of improved color and keeping qualities, and having good baking quality which is retained over a period of several days to a markedly greater extent than yeast made by heretofore known processes.

Other objects of the invention will in part be obvious and will in part appear hereinafter.

The invention accordingly comprises the several steps and the relation of one or more of such steps with respect to each of the others, which are exemplified in the following detailed disclosure, and the scope of the application of which will be indicated in the claims.

The present process is particularly applicable to the manufacture of bakers' yeast with aeration by heretofore known methods in which a portion of the yeast nutrients is initially placed in the fermenter and stocked with yeast and the remainder of the nutrients is added either fractionally or slowly and substantially continuously in accordance with the growth requirements of the yeast.

Principal features of the invention are the use of stock yeast of the high protein type, (that is, a yeast having a protein content of over 50% on a dry basis when grown under usual operating conditions) in amounts upwards of 30% on the total sugar (calculated as molasses) which is present in the nutrients used during the propagating period, and during the propagating so limiting the inorganic (i. e. ammonium) nitrogen nutrition as to produce high yields of yeast having a protein content of less than 50%.

Heretofore, in the use of such high protein stock yeast, attempts have been made to control the protein in the final yeast product so that it will be below 50%, by limiting the assimilable nitrogen supply, with the result that a marked decrease in yield was obtained and there was a tendency toward the production of yeast poorer in quality, both as regards color, baking strength and keeping quality. Furthermore, in such processes, it has been the practice to use only 20% or less of stock yeast, on the basis above indicated.

Although our invention is not limited to the use of molasses and inorganic phosphorus, as sources of sugar material and phosphorus nutriment, or to the use of inorganic nitrogen as the source of nitrogen nutriment; and, as above indicated, is not limited to a continuous-addition process, the following example will illustrate the manner in which the invention may be applied commercially:

Molasses is treated in a known manner with about 2% ammonium phosphate ($NH_4H_2PO_4$), the mixture being diluted to about 40° Bg. and heated to about 95° C., and filtered if necessary. A portion of this mixture is placed in a fermenter and diluted with water to about 1.8° Bg. or less, whereupon upwards of 30% and preferably about 60% (based on the total molasses) of high protein type of stock yeast is added. Aeration is then commenced and the remainder of the molasses and ammonium phosphate mixture is added slowly and substantially continuously, in accordance with the requirements of the yeast, until the whole is in the fermenter in approximately eight hours. During most of this period the acidity of the propagating liquid is preferably maintained at a pH of between 4.0 and 6.0, preferably between 4.5 and 5.0, by the fractional addition of aqua ammonia, or some other suitable neutralizing agent; and for about one half hour after the final addition of the molasses mixture, the aeration is continued to ripen the yeast and finish off at an acidity of preferably around a pH of 6.0.

The initial addition of the ammonium phosphate to the molasses is a convenient way of simultaneously clarifying the molasses and enriching it in yeast assimilable phosphate and nitrogen, but it is to be understood that the molasses may be treated in any desired manner if necessary and that compounds containing yeast assimilable nitrogen and phosphate may be added to the fermenter at the beginning or fractionally during the propagating period. We have found that for the best results, the amount of assimilable nitrogen added to the molasses should be from 4% to 12% and preferably 7% to 8% [expressed as ammonium sulphate, $(NH_4)_2SO_4$], and that it must be either wholly or in part of an inorganic type.

When aqua ammonia is used as a neutralizing agent, it is usually unnecessary to add ammonium sulphate as a further nitrogen source or to control the pH, as the yeast is able to utilize the nitrogen from the aqua ammonia and continuously generates sufficient acidity.

By such use of high protein type stock and limited inorganic nitrogen supply, net yields of above 100% compressed yeast (26% solids) based on the molasses may be obtained having a protein content of less than 50% (e. g. about 47%), and having extremely good color and keeping qualities, and good baking quality which is retained over a period of several days to a markedly greater extent than yeast made by heretofore known processes.

It is to be understood, however, that if such continued retention of the baking quality is not essential, the percentage of stock yeast may be decreased as indicated with the result that a somewhat higher protein content will result in the final yeast.

It will thus be seen that by means of the present invention, a convenient, efficient and economical process of manufacturing bakers' yeast in high yield and of improved color, baking and keeping qualities is provided, and since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described. Particularly it is to be understood that in said claims, ingredients or compounds recited in the singular are intended to include compatible mixtures of such ingredients wherever the sense permits.

Having described our invention, what we claim as new and desire to secure by Letters Patent is:

1. A process of manufacturing bakers' yeast of low protein content which includes providing, in a yeast nutrient solution containing yeast assimilable sugar and a yeast assimilable inorganic nitrogen compound, a high protein type of stock yeast having a protein content of over 50% on a dry basis in an amount of at least 30% of the total sugar, calculated as molasses, which is present in the yeast nutrient solution during the propagation of yeast therein, propagating the yeast in the nutrient solution with aeration, and during the period of propagation limiting the yeast assimilable inorganic nitrogen nutriment to about 4% to about 12% expressed as ammonium sulfate and based upon the total sugar calculated as molasses whereby there is produced a high yield of yeast of good baking and improved keeping qualities, and having a protein content substantially less than that of the stock yeast added to the yeast nutrient solution.

2. A process of manufacturing bakers' yeast of low protein content which includes providing, in a yeast nutrient solution containing yeast assimilable sugar and a yeast assimilable inorganic nitrogen compound, a high protein type of stock yeast having a protein content of over 50% on a dry basis in an amount of at least 30% of the total sugar, calculated as molasses, which is present in the yeast nutrient solution during the propagation of yeast therein, propagating the yeast in the nutrient solution with aeration, and during the period of propagation limiting the yeast assimilable inorganic nitrogen nutriment to about 4% to about 12% expressed as ammonium sulfate and based upon the total sugar calculated as molasses whereby there is produced a high yield of yeast of good baking and improved keeping qualities, and having a protein content of less than 50% on a dry basis.

3. A process of manufacturing bakers' yeast of low protein content which includes adding to a molasses-containing dilute yeast nutrient solution containing yeast assimilable sugar and a yeast assimilable inorganic nitrogen compound, a high protein type stock yeast having a protein content of over 50% on a dry basis in an amount of at least 30% of the total sugar calculated as molasses which is present in the yeast nutrient solution during the propagation of yeast therein, propagating the yeast in the nutrient solution with aeration, and during the period of propagation adding yeast nutrients in accordance with the growth requirements of the yeast to produce a high yield while supplying yeast assimilable inorganic nitrogen nutriment in amounts limited to about 4% to about 12% expressed as ammonium sulfate and based upon the total sugar calculated as molasses, whereby there is produced a yeast of good baking and improved geeping qualities, and having a protein content of less than 50% on a dry basis.

4. A process of manufacturing bakers' yeast which includes preparing a molasses-containing yeast nutrient solution, diluting a portion thereof, adding to such diluted portion a high protein type stock yeast having a protein content of over 50% on a dry basis in an amount of at least 30% of the total sugar, calculated as molasses, which is present in the yeast nutrient solution during the propagation of yeast therein, propagating the yeast in the nutrient solution with aeration, and during the period of propagation adding the remainder of the prepared nutrient solution in accordance with the growth requirements of the yeast to produce a high yield, supplying yeast assimilable inorganic nitrogen nutriment in amounts limited to about 4% to about 12% expressed as ammonium sulfate and based upon the total sugar calculated as molasses whereby there is produced a yeast product of good baking and improved keeping qualities, and having a protein content of less than 50% on a dry basis.

5. A process as claimed in claim 4, in which both ammonium phosphate and ammonium sulfate are used as sources of yeast assimilable inorganic nitrogen and in which during the period of propagation with aeration aqua ammonia is added to maintain a pH value of between about 4.5 and 5.0, the total yeast assimilable inorganic nitrogen present during propagation being between 4% and 12% expressed as ammonium sulfate, and based upon the total sugar calculated as molasses.

GEORGE W. KIRBY.
CHARLES N. FREY.